United States Patent [19]

Bales et al.

[11] Patent Number: 5,034,496
[45] Date of Patent: Jul. 23, 1991

[54] POLYCARBONATE COMPOSITIONS

[75] Inventors: Stephen E. Bales; Ronald L. Yates, both of Midland, Mich.

[73] Assignee: The Dow Chemical Company, Midland, Mich.

[21] Appl. No.: 364,598

[22] Filed: Jun. 12, 1989

Related U.S. Application Data

[63] Continuation-in-part of Ser. No. 38,562, Apr. 15, 1987, abandoned.

[51] Int. Cl.$^5$ .................... C08G 64/42; C08G 64/06
[52] U.S. Cl. .................................... 528/128; 528/193; 528/204; 522/163; 522/905
[58] Field of Search ............... 522/163, 905; 528/125, 528/128, 204, 193

[56] References Cited

U.S. PATENT DOCUMENTS

| | | | |
|---|---|---|---|
| 3,729,447 | 4/1973 | Haberland et al. | 528/202 |
| 3,875,112 | 4/1975 | Bockmann et al. | 528/204 |
| 3,926,641 | 12/1975 | Rosen | 522/905 |
| 4,199,540 | 4/1980 | Adelmann | 522/163 |
| 4,333,809 | 6/1982 | Schreckenberg | 522/163 |
| 4,379,910 | 4/1983 | Mark et al. | 528/204 |
| 4,410,572 | 10/1983 | Sasama et al. | 427/164 |
| 4,539,370 | 9/1985 | Nouvertne et al. | 525/147 |
| 4,608,430 | 8/1986 | Mark et al. | 528/204 |

FOREIGN PATENT DOCUMENTS

| | | |
|---|---|---|
| 0146836 | 4/1984 | European Pat. Off. . |
| 2746141 | 4/1979 | Fed. Rep. of Germany ...... 528/125 |
| 144095 | 12/1977 | Japan . |
| 61-238822 | 10/1986 | Japan . |
| 121724 | 6/1987 | Japan . |

OTHER PUBLICATIONS

Chemical Abstract Description of Registry #111886-0-1-2.

*Primary Examiner*—John C. Bleutge
*Assistant Examiner*—David Buttner

[57] ABSTRACT

Polycarbonates formed at least in part from dihydroxy aryl ketones and optionally benzylic hydrogen containing aromatic diols may be crosslinked by exposure to electromagnetic radiation such as ultraviolet light, thereby imparting improved solvent resistance.

6 Claims, No Drawings

POLYCARBONATE COMPOSITIONS

CROSS-REFERENCE TO RELATED APPLICATION

This is a continuation in part, of application Ser. No. 038,562 filed Apr. 15, 1987, now abandoned.

BACKGROUND OF THE INVENTION

This invention concerns a novel polymeric composition. Specifically, this invention concerns a novel polycarbonate composition prepared from dihydroxyaryl ketones.

Polycarbonate resins are well-known in the prior art. Exemplary of the known polycarbonate resins are the polycarbonates of bisphenol-A as described in U.S. Pat. No. 3,028,365. Similarly, information exemplary of the polycarbonate resins known in the art can be found in Volume 18 of the *Kirk-Othmer Encyclopedia of Chemical Technology*, pages 479-493 (3rd Edition). Polycarbonate resins are useful thermoplastics because of their desirable physical properties. Those physical properties for which polycarbonates are most often employed are impact strength or toughness and clarity. Polycarbonate resins are also known for their ductility and relatively high softening temperatures.

In certain applications, it has been found desirable to incorporate ester moieties in the backbone of the polycarbonate resin. Thermoplastic resins comprising both ester and carbonate linkages in their backbone chain are known as polyestercarbonate resins. Exemplary of such resins are those described in U.S. Pats. No. 3,030,331; 3,169,121; 3,220,976; 4,156,069; 4,278,787; 4,330,662; and 4,360,656. Polyestercarbonate resins have been found to possess higher heat resistance than many carbonate resins. Therefore, the polyestercarbonate resins are often employed in applications requiring exposure to relatively high temperatures.

While the known polycarbonate resins and known polyestercarbonate resins possess many advantageous properties, these resins nonetheless possess some physical properties which make them unsuitable for use in certain applications. For instance, known polycarbonate and polyestercarbonate resins possess a relatively low solvent stress crack resistance. Therefore, known polycarbonate and polyestercarbonate resins have proven unsuitable for use in applications requiring a high level of solvent stress crack resistance.

It is highly desirable to produce a polycarbonate resin and/or polyestercarbonate resin possessing improved properties, especially a high level of solvent stress crack resistance. Moreover, it is desirable to achieve said increase in solvent stress crack resistance without sacrificing other desirable physical properties such as toughness, impact strength, clarity, etc. normally possessed by polycarbonate and polyestercarbonate resins. Additionally, it is desirable that a resin possessing the higher level of solvent stress crack resistance be capable of easy production and economical use. It is to these and other similar goals that the present invention is directed.

Summary of the Invention

The present invention concerns a polymeric composition comprising repeating units of the formula:

R—O—X—O— wherein R independently each occurrence is the divalent nucleus of an aliphatic or aromatic diol having from 2 to about 40 carbon atoms, and X corresponds to the formula:

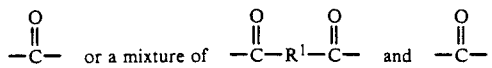

wherein $R^1$ is the divalent nucleus of an aliphatic or aromatic dicarboxylic acid, provided further that in from about 5 to 100 mole percent of the repeating units, R is the divalent nucleus of a dihydroxyaryl ketone.

The compositions of the invention in their preferred embodiment may be formed, molded, or otherwise incorporated into articles which upon exposure to actinic radiation or other suitable electromagnetic radiation causes the formation of crosslinking bonds thereby imparting improved solvent resistance to the completed structure. Accordingly, the present invention also encompasses the crosslinked resins resulting from the above procedure.

DETAILED DESCRIPTION OF THE INVENTION

By the term "aliphatic" as used herein are also included cycloaliphatic moieties as well as aromatic or cycloaliphatic substituted aliphatic moieties. By the term "aromatic" are also included aliphatically substituted aromatic moieties. By the term "cycloaliphatic" are included aliphatic carbocyclic as well as heterocyclic moieties.

The dihydroxyaryl ketones comprising at least 5 mole percent of the diol mixture from which the present polycarbonate compositions are derived have at least one moiety corresponding to the formula:

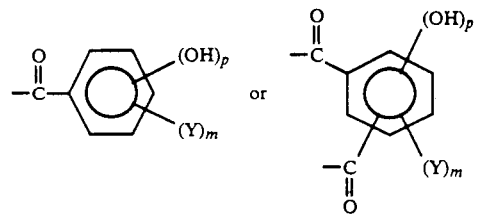

wherein Y is hydrogen, chlorine, bromine, fluorine, or a monovalent hydrocarbon group having up to 6 carbons; p is one or two corresponding to the number of hydroxyl substituents present in the moiety, and m is 2, 3, or 4 corresponding to the number to remaining Y substituents in the moiety, provided that in total the dihydroxyarylketone contains two hydroxyl moieties. In a preferred embodiment in more than 5 and up to 50 mole percent of the repeating units, and in a most preferred embodiment in from about 10 to 40 mole percent of the repeating units, R is the divalent nucleus of a dihydroxyaryl ketone.

Exemplary of dihydroxyarylketones suitable for use as the diol in the practice of the present invention are 4,4'-dihydroxybenzophenone (bisphenol-K); 3,3',5,5'-dihydroxy-benzophenone (tetrabromo, bisphenol-K); 2,4-dihydroxy-benzophenone; 2,6-dihydroxyanthraquinone; and 3',5'-dihydroxyacetophenone. Preferably, the dihydroxyaryl-ketone suitable for use as the diol in the practice of the present invention is 4,4'-dihydroxybenzophenone.

In addition of the previously mentioned dihydroxyaryl ketones, the present polycarbonate compositions may include remnants of one or more aliphatic or aromatic diols. Suitable diols are advantageously represented by the formula:

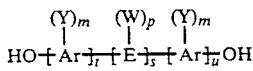

In the formula Ar is an aromatic group such as phenylene, biphenylene, naphthenylene, anthracenylene, and the like. E is alkylene or alkylidene such as methylene, ethylene, ethylidene, propylene, propylidene, isopropylidene, butylene, butylidene, isobutylidene, amylene, isoamylene, amylidene, and isoamylidene. Additonally, E may be cycloalaphatic such as cyclopentylene, cycohexylene, phthalein, etc.; a sulfur-containing linkage such as sulfide, polysulfide, sulfoxide, polysulfoxide, sulfone or polysulfone; an ether linkage; a tertiary nitrogen group; or a silicon containing linkage such as silane, polysilane, siloxy, or polysiloxy. W is hydrogen or a monovalent hydrocarbon group such as alkyl, aryl, arylalkyl, or cycloaliphatic. Y is as previously defined. The letter n is any whole number from and including 0 through the number of positions on Ar available for substitution; q is any whole number from and including 0 through the number of positions on E available for substitution; t is a whole number equal to at least 1; s is either 0 or 1; and u is any whole number including 0.

Exemplary of the diols from which R may be derived are the alkylene glycols, polyalkylene glycols and cycloaliphatic diols, the aromatic diols including alkaryl diols, dihydric phenols, and the aromatic diols having cyclic or heterocyclic groups, such as phenolphthalein. Of the diols, the dihydric phenols are preferred.

Examples of such dihydric phenols include 2,2-bis(4-hydroxyphenyl) propane (Bisphenol-A); bis-(4-hydroxyphenyl)methane (bisphenol-F); 4,4'-dihydroxybenzophenone (bisphenol-K); 1,2-bis (4-hydroxyphenyl) ethane; 4,4'-dihydroxybiphenyl; and the alkyl and/or halogen substituted derivatives of the aforementioned dihydric phenols.

In a preferred embodiment of this invention, R is derived from a mixture of diols including in addition to a dihydroxyaryl ketone a benzylic hydrogen containing aromatic diol containing at least one moiety having the formula:

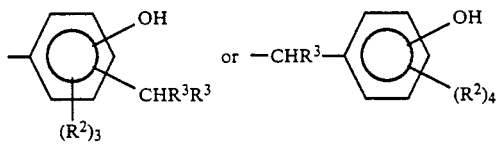

wherein $R^2$ may be either hydroxyl or $R^3$, and $R^3$ is hydrogen, halogen, alkyl, aryl, alkoxy, or aryloxy, provided that in total such compound contain two aromatically substituted hydroxyl groups. Alternatively, R may represent the remnant of a dihydroxy aryl ketone additionally containing benzylic hydrogen functionality. As used herein, such aromatic diols are referred to as "benzylic hydrogen containing diols".

Examples of benzylic hydrogen containing diols include, 3,3',5,5'-tetramethyl-4,4'-dihydroxybenzophenone (tetramethylbisphenol-K); bis(4-hydroxyphenyl) methane (bisphenol-F); bis (2,3-dimethyl-4-hydroxyphenyl)methane (tetramethylbisphenol-F); 2,2-bis(3-methyl-4-hydroxyphenyl) propane (dimethylbisphenol-A); 2,2-bis(3,5-dimethyl-4-hydroxyphenyl)propane (tetramethylbisphenol-A); 1,2-bis(3,5-dimethyl-4-hydroxyphenyl)ethane; and methylhydroquinone. The prefered benzylic hydrogen containing diols are dimethyl bisphenol-A, tetramethyl bisphenol-A, bisphenol-F, or a mixture thereof due to enhanced curing rates obtained by their use.

The presence of a polycarbonate derivative from such benzylic hydrogen containing diol in addition to the dihydroxyaryl ketone has been found to substantially improve the rate of crosslinking that results upon exposure to the invented polycarbonates to crosslinking radiation.

In the repeating units of the present invention having the formula:

—R—O—X—O—

X corresponds to the formula:

or a mixture of

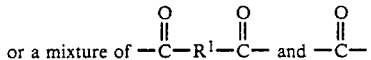

wherein $R^1$ is divalent aliphatic, aromatic, aliphaticsubstituted aromatic, or aromatic-substituted aliphatic radical. When X has the formula:

the composition of the present invention is a polycarbonate. When a portion of X has the formula:

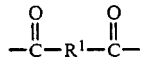

the composition of the present invention is a polyester-carbonate.

The compositions of the present invention are prepared by reacting a diol with a carbonate precursor. Exemplary of the carbonate precursors suitable for use in the present invention are the carbonyl halides, the haloformates, and other compounds which will react with terminal hydroxyl groups to form carbonate linkages Exemplary of the carbonyl halides suitable for use in the present invention are carbonyl bromide, carbonyl chloride (phosgene) and mixtures thereof Suitable haloformates include the bischloroformates of dihydric phenols such as bisphenol-A The preferred carbonate precursor for use in the present invention is phosgene.

When the compositions according to the present invention are polyestercarbonates, such polyestercarbonates are prepared by reacting a diol with a carbonate precursor and a difunctional carboxylic acid or carboxylic acid halide Exemplary of the difunctional carboxylic acids which may be used in the production of polyestercarbonates according to the present invention are the difunctional aliphatic carboxylic acids, the difunctional aliphatic aromatic carboxylic acids, and the difunctional aromatic carboxylic acids. Suitably such difunctional carboxylic acids have the formula:

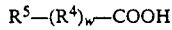

wherein $R^4$ is an alkylene, alkylidene, aralkylene, aralkylidene, or cycloaliphatic group; an alkylene, alkylidene, or cycloaliphatic group containing ethylenic unsaturation: an aromatic group such as phenylene, biphenylene, substituted phenylene, and the like: two or more aromatic groups connected through nonaromatic linkages such as alkylene or alkylidene groups; and the like. $R^5$ is either a carboxyl or a hydroxyl group. The letter w represents 1 where $R^5$ is a hydroxyl group and either 0 or 1 where $R^5$ is a carboxyl group. The preferred difunctional carboxylic acids are those that are represented by the general formula:

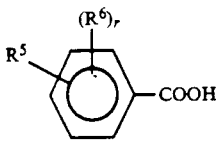

wherein $R^5$ is as defined above: r represents a whole number having a value of from 0 to 4 inclusive: and $R^6$ represents an inorganic atom such as a halogen, an organic group such as a monovalent hydrocarbon group such as an alkyl, aryl, aralkyl, alkaryl, cycloaliphatic group: or an inorganic group such as a nitro group, etc. When more than one $R^6$ substituent is present they may be the same or different. Highly preferred for use according to the present invention are aromatic dicarboxylic acids having from 8 to 40 carbons.

It is understood that in the compositions of the present invention when X is not a carboxyl group $R^1$ may have one or more different structures. That is, $R^1$ need not be the same divalent radical each time it appears in the composition of the present invention.

Methods of producing polycarbonates and polyestercarbonates are well-known in the prior art. Such methods are suitable for use in forming the polymeric compositions of the present invention. Suitable methods for preparing polycarbonate resins are set forth in U.S. Pat. Nos. 3,248,414; 3,153,008; 3,215,668; 3,187,065; 3,028,365; 2,999,846; 2,964,974; 2,970,137; 1,991,273; and 2,999,835; all of which are incorporated herein by reference. Similarly, methods of producing polyestercarbonates are known in the prior art. Exemplary of methods by which polyestercarbonates may be produced are those methods described in U.S. Pat. Nos. 3,169,121; 4,287,787; 4,156,069; 4,260,731; 4,330,662; 4,360,656; 4,374,973; 4,255,556; 4,388,455; 4,355,150; 4,194,038;: 4,238,596; 4,238,597; 4,252,939; 4,369,303; and 4,105,633; and articles by Kolesnikov et al. published in Vysokomol Soedin as B9,49 (1967);A9, 1012 (1967): A9, 1520 (1967): and A10, 145 (1968); all of which are incorporated herein by reference. Generally the aforementioned processes involve the reaction of dihydroxyl containing compounds with phosgene or other suitable carbonate precursor or with a mixture phosgene or other carbonate precursor and a dicarboxylic acid, acid anhydride or acid halide.

The prior art processes which may be used to prepare the compositions of the present invention generally employ a chain stopping agent (terminator) during the polymerization step to control molecular weight. The concentration of the chain stopping agent in the reaction mixture has a direct effect on both the molecular weight and the viscosity of the polycarbonate or polyestercarbonate prepared. Chain stopping agents are monofunctional compounds which react with a carbonate precursor site on the backbone of the polymer and by such reaction ends the propagation of the polymer at such a point. Preferable chain stopping agents include monofunctional compounds that are reactive with the carbonate precursor employed in forming the polycarbonate or polyestercarbonate prepared. Examples of desirable chain stopping agents include monofunctional aromatic alcohols, thiols, and amines. Preferred chain stopping agents are the aromatic alcohols and the aliphatic alcohols.

The compositions of the present invention re advantageously represented by the formula:

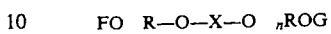

wherein R and X have the descriptions herein before provided; n is a whole number from about 5 to about 300; and F and G are, independently, either hydrogen or other terminating groups common to polyesters or polycarbonates. Desirably, F and G are independently represented by the formula:

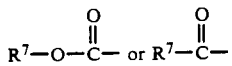

wherein $R^7$ is the nucleus of an alkyl, aryl, or alkylsubstituted aryl alcohol or carboxylic acid.

While the molecular weight of the polymers according to the present invention is not particularly critical, those polymers having weight average molecular weight ($M_w$, determined by gel permeation chromatography using a bisphenol-A polycarbonate calibration curve) greater than 20,000 are desirable. The polymers according to the present invention which have a relatively high molecular weight, e.g., those having an $M_w$ of at least about 25,000 up to and including those having an $M_w$ of about 60,000, are found to exhibit the properties and physical characteristics most desirable of molding resins. Most preferred for this purpose are those polymers according to the present invention having an Mw in the range from about 25,000 to about 40,000 and $M_w/M_n$ (wherein $M_n$ is the number average molecular weight) from about 1.5 to about 5. Preferred polymers according to the present invention have inherent viscosities (measured in methylene chloride at 0.5 grams per deciliter and 25° C.) in the range from about 0.35 to about 1 deciliter per gram (dl/g), most preferably from 0.45 to 0.70 dl/g.

Preferably, the polymers of the invention have maximum elongations at break measured according to ASTM Test Method D-638 of less than 200 percent, most preferably from 40 to 150 percent.

Applicants have discovered that the compositions of the present invention possess improved physical properties compared to prior art polycarbonate and polyestercarbonate compositions. The improved physical properties include improved impact resistance, resistance to thermal embrittlement and superior tensile properties, especially elongation and post yield stress drop.

More importantly, applicants have discovered that the polymers according to the preferred embodiment of the present invention are crosslinkable upon exposure to electromagnetic radiation.

Any electromagnetic radiation capable of inducing crosslinking in the polymers of the present invention is suitable for use in conjunction with the present invention. Typically, the electromagnetic radiation capable of inducing crosslinking in the polymers of the present invention has a wavelength of from about 250 nanometers to about 400 nanometers, preferably, from about 300 nanometers to about 350 nanometers. The recited wavelengths induce crosslinking more quickly than wavelengths outside the recited ranges.

The crosslinking induced by exposure to electromagnetic radiation provides the polymers according to the present invention with excellent resistance to solvent stress cracking. This improved solvent stress cracking resistance is obtained without sacrificing the other desirable physical properties of the polymers according to the present invention such as toughness, clarity, and ductility.

In order to crosslink the compositions of the present invention they are exposed to electromagnetic radiation for a length of time sufficient, in view of the electromagnetic radiation employed, to introduce a desirable degree of crosslinking in the composition. The length of exposure is dependent on the wavelength and intensity of the electromagnetic radiation employed. A desirable source of electromagnetic radiation is ultraviolet (UV) light having a wavelength of from about 250 to 400 nanometers, preferably from about 300 to about 350 nanometers. The preferred sources of ultraviolet light are those that have sufficient intensity to produce the desired levels of crosslinking when the exposure period is from about 30 seconds to about 30 minutes, preferably from about 30 seconds to about 3 minutes.

The dihydroxyaryl ketone remnant of the present compositions is highly desirable for crosslinking to occur during exposure to electromagnetic radiation. Applicants have discovered that the most rapid rates of crosslinking are obtained in compositions according to the present invention wherein from about 5 to about 30 mole percent of the repeating units, R is derived from a dihydroxyaryl ketone, with the most rapid rates of crosslinking occurring when the above percentage is from about 10 to about 20 mole percent.

Without wishing to be bound by any particular theory of operation, it is believed that crosslinking of the present composition results through generation of a relatively stable carbonyl triplet state from the ketone moiety which is capable of extraction of an available aliphatic hydrogen from an adjacent polymer chain and subsequent covalent bond crosslink formation and conversion of the carbonyl to a hydroxyl moiety.

Applicants have further discovered that when in from about 2.5 to about 95 mole percent of the repeating units, R is derived from a benzylic hydrogen containing diol, (and correspondingly from about 97.5 to 5 mole percent of R is derived from a dihydroxyaryl ketone), the compositions according to the present invention undergo an even more rapid crosslinking reaction upon exposure to electromagnetic radiation. Desirably, the above percentage is from about 5 to about 50 mole percent. The increase in the rate of crosslinking may be somewhat dependent on the exact nature of the benzylic hydrogen containing diol employed in the preparation of the polycarbonate compositions of the present invention. Any remaining quantity of diol remnants may, of course, be remnants of conventional aliphatic or aromatic dihydroxy compositions.

The present invention is illustrated in further detail by the following examples. The examples are for purposes of illustration only, and are not to be construed as limiting the scope of the present invention.

EXAMPLES

Example 1

This example describes the synthesis of several copolymers of bisphenol-A (BA) and bisphenol-K (BK) which copolymers differ in the molar ratio of bisphenol-A to bisphenol-K.

Run 1

A five-liter flask equipped with a thermometer, condenser, nitrogen and phosgene inlets, and a paddle stirrer connected to a Cole Parmer servodyne is charged with 257.96 grams (1.130 mole) bisphenol-A; 26.91 grams (0.126 mole) bisphenol-K; 3.77 grams (0.025 mole) p-tertbutylphenol as a chain terminating agent; 258.3 grams (3.266 mole) pyridine; and 2.5 liters of methylene chloride.

The contents of the flask are stirred at 200 revolutions per minute (rpm) under a slow nitrogen purge and 129.0 grams (1.3 mole) of phosgene is added to the flask over 55 minutes while maintaining the contents of the flask at a temperature between 22° C. and 25° C. Five milliliters of methanol and 0.44 liters of 3 Normal hydrochloric acid are added to the contents of the flask. The contents of the flask are stirred for an additional 15 minutes and then poured into a four liter separatory funnel. The methylene chloride phase containing the polycarbonate resin is separated and washed with 0.5 liter of 0.5 Normal hydrochloric acid.

The washed methylene chloride phase is passed through a column of macroporus cation ion exchange resin commercially available from The Dow Chemical Company under the trade designation DOWEX® MSC-1-H (0.5 liter bed volume). The polycarbonate is then isolated by adding one volume of the polycarbonate-containing methylene chloride phase to four volumes of hexane in an explosion resistant blender.

The precipitated product is then dried in a vacuum oven at 120° C. for 48 hours. The resulting product weighs 296.4 grams, has an inherent viscosity of 0.53 deciliters per gram (dL/g) as measured in methylene chloride at 25° C., and a concentration of 0.5 grams per deciliter, and has a bisphenol-A/bisphenol-K molar ratio of 90/10 as determined by nuclear magnetic resonance and infrared spectroscopy.

Runs 2-5

The general procedure of Run 1 is repeated. By varying the amounts of reactants employed, polycarbonate compositions having different bisphenol-A to bisphenol-K molar ratios are obtained. The ratio of bisphenol-A to bisphenol-K for various runs is set forth in Table 1.

Various physical properties are determined for the compositions produced in runs 1-5. The following procedures are used to determine these physical properties:

Compression molded plaques (0.125 inch in thickness) are prepared at 270° to 290° C. Test specimens are machined from the plaques.

The notched Izod impact strength of the compositions are determined according to the American Society for Testing and Materials (ASTM) Test Method D-256, wherein a 0.01 inch notch radius is employed.

Tensile properties including tensile strength at yield (TY), elongation at yield (EY), elongation at break (EB), tensile modulus (TM), and post-yield stress drop (PYSD) are performed according to ASTM Test Method D-638.

The determination of PYSD is described by Bubeck et al., in 24 Polymer Engineering and Science, 1142 (1984).

TABLE I

| Sample No. | BA/BK molar ratio | IV dL/g | Notched Izod ft-lbs/in | TY psi | EY % | EB % | PYSD % | TM $10^5$ psi |
|---|---|---|---|---|---|---|---|---|
| $C_1$* | 100/0 | 0.55 | 14.8 | 9054 | 6.1 | >50 | 22.9 | 3.28 |
| 1 | 90/10 | 0.53 | 14.4 | 9220 | 6.4 | >50 | 22.5 | 3.16 |
| 2 | 80/20 | 0.54 | 14.2 | 9125 | 7.0 | >50 | 20.3 | 3.14 |
| 3 | 70/30 | 0.56 | 13.6 | 8971 | 7.1 | >50 | 19.2 | 3.17 |
| 4 | 60/40 | 0.64 | 13.0 | 9079 | 7.3 | >50 | 17.4 | 3.24 |
| 5 | 50/50 | 0.64 | 14.0 | 9050 | 7.4 | >50 | 15.9 | 3.32 |

*Not an example of the present invention.

As can be seen from Table I, the compositions according to the present invention exhibit improvements in elongation at yield and post-yield stress drop without a significant decrease in any of the other physical properties.

Example 2

The general procedure of Example 1 is repeated to produce additional samples of polycarbonate compositions. The compositions so prepared have approximately the same molecular weight, as evidenced by inherent viscosity measurements, but differ in the bisphenol-A to bisphenol-K ratios.

The compositions so prepared are compression molded at about 270° C. to about 290° C. into films having a thickness of about 10 mils (0.01 inch). The films are exposed to ultra-violet radiation to determine the effect of bisphenol-A to bisphenol-K molar concentration on crosslinkability. The ultra-violet light source is a 450 Watt medium pressure mercury arc lamp in a quartz water-cooled immersion well commercially available from the Hanovia Corporation. The lamp to film distance is adjusted to expose the film to an irradiance of about 5mW/cm². The irradiance level is determined through the use of a IL-390 Lite Bug commercially available from the International Light Corporation.

The amount of crosslinking induced in the polymer films by exposure to the ultra-violet light is determined by extraction. The irradiated films are placed in methylene chloride for 72 to 96 hours. The non-crosslinked polymer is dissolved in the methylene chloride, the crosslinked polymer remains as a gel. The total weight of gel remaining after extraction is determined and compared to the total weight of the irradiated film prior to extraction. The percent of gel remaining after extraction is directly proportional to the amount of crosslinked polymer present in the irradiated films.

The bisphenol-A to bisphenol-K molar ratio, inherent viscosity and percent gel remaining after extraction is set forth in Table II.

TABLE II

| Sample No. | Bis-A/Bis-K ratio[1] | I.V. dL/g[2] | % gel 5 min[3] | % gel 10 min | % gel 20 min | % gel 30 min | % gel 60 min |
|---|---|---|---|---|---|---|---|
| $C_2$* | 100/0 | 0.57 | 0 | 0 | 0 | 0 | 0 |
| $C_3$* | 98/2 | 0.55 | 0 | 0 | 0 | 0 | 24 |
| 6 | 95/5 | 0.52 | 0 | 0 | 3 | 41 | 64 |
| 7 | 90/10 | 0.53 | 0 | 3 | 33 | 51 | 67 |
| 8 | 90/10 | 0.55 | 0 | 4 | 34 | 53 | 67 |
| 9 | 90/10 | 0.58 | 0 | 14 | 49 | 64 | 79 |
| 10 | 85/15 | 0.55 | 0 | 6 | 29 | 38 | 64 |
| 11 | 80/20 | 0.54 | 0 | 8 | 22 | 35 | 60 |
| 12 | 70/30 | 0.58 | 0 | 5 | 15 | 22 | 32 |
| 13 | 60/40 | 0.59 | 0 | 3 | 8 | 13 | 19 |
| 14 | 50/50 | 0.58 | 0 | 0 | 3 | 8 | 13 |

*Not an example of the present invention.
[1]Molar ratio of bisphenol-A to bisphenol-K in polymer composition.
[2]Inherent Viscosity in deciliters per gram determined in methylene chloride at 25° C.
[3]Percent gel remaining after extraction as a function of exposure time in minutes per side of film.

The results presented in Table II indicate that the most rapid crosslinking occurs when the molar ratio of Bis-A to Bis-K is from about 90/10 to about 60/40.

Example 3

Additional samples of polycarbonate compositions according to the present invention are prepared according to the general procedure of Example 1. The compositions prepared all have a Bis-A to Bis-K molar ratio of about 90/10. The compositions are prepared so that the compositions have different molecular weights as evidenced by inherent viscosity. This is achieved by forming the compositions in the presence of varying amounts of p-tertbutylphenol, a chain stopping agent.

The effect of molecular weight (inherent viscosity) on crosslinkability is determined according to the general procedure of Example 2. The results of this testing are set forth in Table III.

TABLE III

| Sample No. | Mole % TBP[1] | I.V. dL/g[2] | % gel 5 min[3] | % gel 10 min | % gel 20 min | % gel 30 min | % gel 60 min |
|---|---|---|---|---|---|---|---|
| 15 | 5.0 | 0.33 | 0 | 0 | 2 | 16 | 33 |
| 16 | 3.0 | 0.41 | 0 | 0 | 18 | 30 | 53 |

TABLE III-continued

| Sample No. | Mole % TBP[1] | I.V. dL/g[2] | % gel 5 min[3] | % gel 10 min | % gel 20 min | % gel 30 min | % gel 60 min |
|---|---|---|---|---|---|---|---|
| 17 | 2.0 | 0.53 | 0 | 8 | 33 | 51 | 67 |
| 18 | 1.75 | 0.58 | 0 | 12 | 42 | 67 | 76 |
| 19 | 1.25 | 0.67 | 3 | 29 | 58 | 71 | 88 |
| 20 | 0.75 | 0.80 | 13 | 50 | 81 | 90 | 94 |

[1] Mole percent of p-tertbutylphenol (chain stopping agent).
[2] Inherent viscosity in deciliters per gram as measured in methylene chloride at 25° C.
[3] Percent gel remaining after extraction as a function of exposure time in minutes per side of film.

Example 4

A key element of the compositions of the present invention is improved resistance to solvent stress cracking following exposure to electromagnetic radiation. In order to demonstrate this property improvement, compression molded films of 10 mils thickness, prepared at about 270° to 290° C., are irradiated as described in Example 2. The films are then cut into strips 0.2 in. wide coiled into loops of 3.15 inches circumference (resulting in a strain level of about 1.0 percent), immersed in a solvent, and the time to fracture is determined. These results are recorded in Table IV.

TABLE IV

| Sample No. | C4* | C5* | 21 | 22 | 23 |
|---|---|---|---|---|---|
| BA/BK Molar Ratio | 100/0[a] | 100/0 | 90/10[b] | 90/10 | 90/10 |
| Irrad. Time (min/side) | 0 | 60 | 0 | 10 | 60 |
| % gel | 0 | 0 | 0 | 7 | 84 |
| Failure Time (sec) in indicated solvent | | | | | |
| Acetone | <1 | <1 | <1 | >180 | >180 |
| CCl4 | 1 | 1 | 4 | >180 | >180 |
| Ethyl Acetate | 43 | NM[c] | NM | >180 | >180 |
| Tetrahydrofuran | 15 | 16 | 14 | 95 | >180 |
| Methyl Ethyl Ketone | 32 | NM | 27 | >180 | >180 |
| Perchloroethylene | 55 | 55 | >120 | >180 | >180 |
| Perchloroethylene/-Acetone (3/1 volume ratio) | 3 | 3 | 1 | >180 | >180 |
| Trichloroethylene/-Hexane (3/1 volume ratio) | <1 | <1 | <1 | >180 | >180 |
| Toluene | 28 | 30 | 29 | >180 | >180 |
| Toluene/Hexane (3/1 volume ratio) | <1 | <1 | <1 | >180 | >180 |
| Dimethylformamide | PD[d] | PD | PD | >60 | >60 |
| CH2Cl2 | PD | PD | PD | >60 | >60 |

[a] IV = 0.57 dL/g,
[b] IV = 0.59 dL/g,
[c] NM = not measured,
[d] PD = partially dissolved, softened extensively during first 60 seconds of exposure.

As evidenced by these results, the irradiated BA/BK polycarbonate exhibits significant improvements in solvent resistance compared to prior art BA polycarbonate and the BA/BK polycarbonate that is not irradiated.

Example 5

Additional tests are conducted to determine the effect of crosslinking on other properties of the polycarbonates of this invention. Compression molded plaques prepared according to Example 1 of BA/BK (90/10 molar ratio) polycarbonates are tested for notched Izod and tensile properties as described in Example 1. These measurements are conducted before and after exposure of the molded plaques to UV irradiation, conducted as in Example 2. These results, recorded in Table V, demonstrate no reduction in the properties measured as a result of the UV irradiation step. These results indicate that the improved solvent resistance obtained following UV irradiation does not require a reduction in toughness and ductility.

TABLE V

| Sample No. | 24 | 25 | 26 | 27 | 28 | 29 |
|---|---|---|---|---|---|---|
| IV (dL/g) | 0.41 | 0.41 | 0.53 | 0.53 | 0.67 | 0.67 |
| Irrad. Time (min/side) | 0 | 60 | 0 | 60 | 0 | 60 |
| TY (psi) | 9352 | 9381 | 9267 | 9242 | 9016 | 9041 |
| EY (%) | 6.2 | 6.3 | 6.4 | 6.3 | 6.8 | 7.0 |
| EB (%) | >50 | >50 | >50 | >50 | >50 | >50 |
| PYSD (%) | 23.3 | 22.9 | 22.1 | 21.9 | 21.5 | 20.8 |
| TM (10^5 psi) | 3.19 | 3.21 | 3.22 | 3.44 | 2.99 | 3.05 |
| N. izod (ft-lb/in) | 11.9 | 11.7 | 13.2 | 13.2 | 13.4 | 13.9 |

Additional tests are conducted using compression molded plaques prepared according to Example 1 of BA/BK polycarbonates (BA/BK molar ratios of 100/0 to 50/50). Measurements of notched Izod using a 5 mil (0.005 inch) notch radius are conducted (ASTM D-256) to assess notch sensitivity. These measurements, conducted before and after UV exposure of the plaques, are recorded in Table VI. As evidenced by these results, BA/BK polycarbonates prepared with BK levels of 15 to 50 mole percent do not exhibit the notch sensitivity of prior art BA polycarbonate. These results further demonstrate no deleterious effect due to the UV irradiation step.

TABLE VI

| Sample No. | BA/BK Molar Ratio | IV dL/g | Irrad. Time min/side | N. Izod ft-lb/in |
|---|---|---|---|---|
| C6* | 100/0 | 0.55 | 0 | 2.0 |
| C7* | 100/0 | 0.55 | 60 | 2.0 |
| 30 | 90/10 | 0.53 | 0 | 2.1 |
| 31 | 90/10 | 0.53 | 60 | 2.1 |
| 32 | 87.5/12.5 | 0.57 | 0 | 4.2 |
| 33 | 87.5/12.5 | 0.57 | 60 | 4.3 |
| 34 | 85/15 | 0.55 | 0 | 14.9 |
| 35 | 85/15 | 0.55 | 60 | 15.0 |
| 36 | 80/20 | 0.54 | 0 | 15.4 |
| 37 | 80/20 | 0.54 | 60 | 16.0 |

TABLE VI-continued

| Sample No. | BA/BK Molar Ratio | IV dL/g | Irrad. Time min/side | N. Izod ft-lb/in |
|---|---|---|---|---|
| 38 | 70/30 | 0.58 | 0 | 15.3 |
| 39 | 70/30 | 0.58 | 60 | 14.9 |
| 40 | 50/50 | 0.58 | 0 | 13.9 |
| 41 | 50/50 | 0.58 | 60 | 13.7 |

*Not an example of the invention.

Example 6

To further describe the scope of this invention, additional BA/Z polycarbonates are prepared according to the general procedure of Example 1. In this example, Z is a diol selected from 2,4-dihydroxybenzophenone (2,4-BK); tetrabromobisphenol-K (TBBK); 2,6-dihydroxyanthraquinone (AQ); 3',5'-dihydroxyacetophenone (AP); 1,4-bis(4-hydroxybenzoyl)benzene (BKK); and 4,4'-bis(4-hydroxybenzoyl)diphenyl ether (BKEK). Compression moldings are prepared and properties are determined as described in Example 1. The results for these polycarbonates, prepared using dihydroxyarylketones other than BK, are recorded in Table VII.

TABLE VII

| Sample No. | Diol Z | BA/Z Molar Ratio | IV dL/g | N. Izod ft-lb/-in | TY psi | EY % | EB % | PYSD % | TM $10^5$ psi |
|---|---|---|---|---|---|---|---|---|---|
| 42 | 2,4-BK | 90/10 | 0.59 | 13.5 | 9,422 | 6.1 | >50 | 23.3 | 3.51 |
| 43 | 2,4-BK | 70/30 | 0.70 | 2.1 | 10,037 | 5.7 | >50 | 22.2 | 4.03 |
| 44 | 2,4-BK | 50/50 | 0.58 | 0.4 | 11,198 | 5.5 | 30 | 25.8 | 4.75 |
| 45 | TBBK | 90/10 | 0.46 | 1.9 | 10,276 | 7.0 | >50 | 21.2 | 3.58 |
| 46 | AQ | 90/10 | 0.48 | 2.1 | 9,797 | 7.2 | 41 | 23.9 | 3.08 |
| 47 | BKK | 90/10 | 0.47 | 13.8 | 9,614 | 6.6 | >50 | 22.4 | 3.26 |
| 48 | BKEK | 90/10 | 0.58 | 15.8 | 9,104 | 6.3 | >50 | 21.8 | 3.30 |
| 49 | AP | 90/10 | 0.55 | NM | NM | NM | NM | NM | NM |

Example 7

To further describe the scope of this invention, additional BA/BK polycarbonate are prepared according to the general procedure of Example 1 wherein the monofunctional chain stopper (CS) is selected from methacryloyl chloride (MAC), hydroxyethylacrylate (HEA), cinnamoyl chloride (CC), and 4-hydroxybenzophenone (HBP). These results are recorded in Table VIII.

TABLE VIII

| Sample No. | CS | Mole % CS | BA/BK Molar Ratio | IV dL/g |
|---|---|---|---|---|
| 50 | MAC | 2.5 | 90/10 | 0.48 |
| 51 | HEA | 5.0 | 95/5 | 0.35 |
| 52 | HEA | 5.0 | 90/10 | 0.34 |
| 53 | HEA | 5.0 | 85/15 | 0.34 |
| 54 | HEA | 5.0 | 80/20 | 0.34 |
| 55 | HEA | 2.5 | 90/10 | 0.48 |
| 56 | HEA | 2.5 | 80/20 | 0.50 |
| 57 | CC | 2.5 | 90/10 | 0.48 |
| 58 | HBP | 2.0 | 90/10 | 0.53 |

Example 8

To further describe the scope of this invention, polycarbonates of BA, BK, and diol Z are prepared according to the general procedure of Example 1. In this example, diol Z is selected from 2,2-bis(3,5-dichloro-4-hydroxyphenyl)propane (TCBA); 2,2-bis(3,5-dibromo-4-hydroxyphenyl)propane (TBBA); hydroquinone (HQ); bis(4-hydroxyphenyl)sulfide (TDP); 2,2-bis(4-hydroxyphenyl)hexafluoropropane (HFBA): phenolphthalein (PP); bis(4-hydroxyphenyl)sulfone (SDP): and trans-1,4-cyclohexanedimethanol (CHDM). Compression moldings are prepared and properties are determined as described in Example 1. These results are recorded in Table IX.

TABLE IX

| Sample No. | Diol Z | BA/BK/Z Molar Ratio | IV dL/g | N. Izod ft-lb/in | TY psi | EY % | EB % | PYSD % | TM $10^5$ psi |
|---|---|---|---|---|---|---|---|---|---|
| 59 | TCBA | 80/10/10 | 0.58 | 2.6 | 9,818 | 6.6 | >50 | 20.2 | 3.58 |
| 60 | TCBA | 60/10/30 | 0.68 | 1.4 | 10,816 | 7.8 | 29 | 19.5 | 3.38 |
| 61 | TBBA | 80/10/10 | 0.59 | 2.3 | 10,202 | 6.8 | >50 | 19.9 | 3.74 |
| 62 | TBBA | 60/10/30 | 0.56 | 1.1 | 11,389 | 6.9 | 15 | 18.7 | 4.24 |
| 63 | HQ | 60/10/30 | 0.56 | 13.1 | 8,750 | 6.4 | >50 | 17.4 | 3.60 |
| 64 | TDP | 60/10/30 | 0.54 | 13.8 | 8,840 | 6.5 | >50 | 20.4 | 3.30 |
| 65 | HFBA | 60/10/30 | 0.48 | 7.6 | 9,230 | 6.5 | 27 | 20.5 | 3.60 |
| 66 | HFBA | 0/10/90 | 0.50 | 2.4 | 9,064 | 6.2 | 17 | 19.9 | 3.59 |
| 67 | PP | 60/10/30 | 0.55 | 3.1 | 11,267 | 7.1 | 19 | 18.7 | 4.00 |
| 68 | SDP | 60/10/30 | 0.55 | 5.9 | 10,037 | 7.3 | 34 | 20.3 | 3.38 |
| 69 | CHDM | 60/10/30 | 0.57 | 14.6 | 8,355 | 6.0 | >50 | 23.4 | 3.14 |

Additional polycarbonates are prepared wherein diol Z is selected from those previously described in this example and from 4,4'-dihydroxybiphenyl (DHB); 1,6-dihydroxynaphthalene (DHN); and poly(tetramethyleneoxide) glycol (PTMO, 2000 molecular weight). These results are recorded in Table X.

TABLE X

| Sample No. | Diol Z | BA/BK/Z Molar Ratio | IV dL/g |
|---|---|---|---|
| 70 | TCBA | 70/10/20 | 0.58 |
| 71 | TBBA | 70/10/20 | 0.54 |
| 72 | DHB | 80/10/10 | 0.50 |
| 73 | DHB | 50/10/40 | 0.65 |
| 74 | HQ | 80/10/10 | 0.58 |
| 75 | TDP | 80/10/10 | 0.53 |

TABLE X-continued

| Sample No. | Diol Z | BA/BK/Z Molar Ratio | IV dL/g |
|---|---|---|---|
| 76 | TDP | 40/10/50 | 0.52 |
| 77 | HFBA | 40/10/50 | 0.50 |
| 78 | PP | 40/10/50 | 0.52 |
| 79 | SDP | 40/10/50 | 0.54 |
| 80 | CHDM | 40/10/50 | 0.59 |
| 81 | DHN | 60/10/30 | 0.50 |
| 82 | PTMO | 89/10/1 | 0.55 |
| 83 | PTMO | 87/10/3 | 0.61 |

Example 9

To further describe the scope of this invention, polycarbonates of BA, BK, and diol Z are prepared according to the general procedure of Example 1. In this example, diol Z is selected from alkylsubstituted aromatic diols containing benzylic hydrogens as described hereinbefore. Diol Z includes dimethylbisphenol-A (DMBA): tetramethylbisphenol-A(TMBA); 1,2-bis(3,5-dimethyl-4-hydroxyphenyl)ethane (TMBE); tetramethylbisphenol-K (TMBK); 3,3',5,5'-tetramethyl-4,4'-dihydroxybiphenyl (TMDHB); 2,2',6,6'-tetrabromo-3,3',5,5'-tetramethyl-4,4'-dihydroxybiphenyl (TTDHB): bis(3,5-dimethyl-4-hydroxybenzyl)durene (DB); methylhydroquinone (MHQ); and bisphenol-F (BF).

Compression molded films of 10 mils thickness are prepared, subjected to UV irradiation, and percent gel is determined as described in Example 2. These results are recorded in Tables XI and XII.

TABLE XI

| Sample No. | Diol Z | BA/BK/Z Molar Ratio | IV dL/g | % gel at Irrad. Time (min/side) of | | | | |
|---|---|---|---|---|---|---|---|---|
| | | | | 5 | 10 | 20 | 30 | 60 |
| 8 | None | 90/10/0 | 0.55 | 0 | 4 | 34 | 53 | 67 |
| 84 | DMBA | 80/10/10 | 0.56 | 13 | 37 | 62 | 71 | 87 |
| 85 | DMBA | 60/10/30 | 0.55 | 24 | 47 | 67 | 72 | NM |
| 86 | TMBA | 80/10/10 | 0.54 | 3 | 24 | 55 | 59 | 67 |
| 87 | TMBA | 40/10/50 | 0.48 | 10 | 38 | 68 | 73 | 80 |
| 88 | BF | 80/10/10 | 0.56 | 10 | 27 | 51 | 63 | NM |
| 89 | BF | 60/10/30 | 0.57 | 31 | 63 | 79 | 86 | 91 |
| 90 | MHQ | 80/10/10 | 0.55 | 0 | 17 | 46 | 61 | 74 |
| 91 | MHQ | 60/10/30 | 0.50 | 6 | 18 | 42 | 56 | 71 |
| 92 | MHQ | 40/10/50 | 0.54 | 10 | 23 | 39 | 50 | 63 |

TABLE XII

| Sample No. | Diol Z | BA/BK/Z Molar Ratio | IV dL/g | % gel at Irrad. Time (min/side) of | | | | |
|---|---|---|---|---|---|---|---|---|
| | | | | 5 | 10 | 20 | 30 | 60 |
| 19 | None | 90/10/0 | 0.67 | 3 | 29 | 58 | 71 | 88 |
| 93 | TMBE | 80/10/10 | 0.70 | 37 | 67 | 76 | 83 | 86 |
| 94 | DB | 80/10/10 | 0.66 | 28 | 61 | 73 | 84 | 91 |
| 95 | TTDHB | 80/10/10 | 0.67 | 5 | 34 | 57 | 73 | 85 |

As evidenced by these results, the polycarbonates of this invention derived from alkyl-substituted aromatic doils exhibit more rapid crosslinking compared to the polycarbonates that are not derived from these aforementioned diols.

Polycarbonates of this example are compression molded and properties are determined as described in Example 1. These results are recorded in Table XIII.

TABLE XIII

| Sample No. | Diol Z | BA/BK/Z Molar Ratio | IV dL/g | N. Izod ft-lb/in | TY psi | EY % | EB % | PYSD % | TM $10^5$ psi |
|---|---|---|---|---|---|---|---|---|---|
| 96 | BF | 80/10/10 | 0.56 | 14.4 | 9,038 | 6.2 | >50 | 22.0 | 3.45 |
| 97 | BF | 60/10/30 | 0.57 | 16.2 | 8,814 | 6.8 | >50 | 20.6 | 3.17 |
| 98 | DMBA | 80/10/10 | 0.56 | 16.2 | 9,396 | 6.8 | >50 | 20.1 | 3.34 |
| 99 | DMBA | 80/10/10 | 0.84 | 6.7 | 9,214 | 6.8 | >50 | 19.4 | 3.47 |
| 100 | DMBA | 60/10/30 | 0.55 | 1.7 | 9,890 | 7.0 | >50 | 18.6 | 3.60 |
| 101 | DMBA | 40/10/50 | 0.55 | 0.8 | 10,132 | 7.0 | >50 | 18.0 | 4.30 |
| 102 | TMBA | 80/10/10 | 0.54 | 2.1 | 9,906 | 6.8 | >50 | 22.8 | 3.56 |
| 103 | TMBA | 40/10/50 | 0.48 | 0.4 | 10,545 | 6.0 | 7 | NM | 3.80 |
| 104 | TMBA | 0/50/50 | 0.55 | 0.8 | 10,400 | 6.9 | >50 | 18.2 | 3.60 |
| 105 | TMBK | 90/0/10 | 0.48 | 1.6 | 9,983 | 6.0 | 29 | 22.9 | 3.61 |
| 106 | TMBK | 70/0/30 | 0.85 | 1.8 | 10,412 | 6.8 | >50 | 20.2 | 3.90 |
| 107 | TMBE | 80/10/10 | 0.71 | 12.0 | 8,932 | 6.8 | >50 | 20.9 | 3.15 |
| 108 | TMBE | 60/10/30 | 0.89 | 2.0 | 9,029 | 6.8 | >50 | 20.1 | 3.26 |
| 109 | DB | 80/10/10 | 0.66 | 6.0 | 9,587 | 7.1 | >50 | 21.9 | 3.18 |
| 110 | TMDHB | 80/10/10 | 0.69 | 8.0 | 9,450 | 6.9 | >50 | 19.2 | 3.50 |
| 111 | TTDHB | 80/10/10 | 0.67 | 5.0 | 9,788 | 7.5 | >50 | 17.6 | 3.35 |
| 112 | MHQ | 80/10/10 | 0.55 | 16.1 | 9,080 | 6.5 | >50 | 20.2 | 3.30 |
| 113 | MHQ | 60/10/30 | 0.50 | 12.4 | 9,220 | 6.8 | >50 | 17.0 | 3.40 |
| 114 | MHQ | 40/10/50 | 0.54 | 9.8 | 9,170 | 7.3 | >50 | 12.7 | 3.50 |

As further evidence of the utility of this invention, additional results for notched Izod (ASTM-D-256, 10 mil notch radius) are recorded in Table XIV for polycarbonates derived from BA, alkyl-substituted aromatic diols as described hereinbefore, and BK. As evidenced by these results, polycarbonates derived from BK exhibit superior impact resistance compared to polycarbonates that are not derived from BK.

TABLE XIV

| Sample No. | Diol Z | BA/BK/Z Molar Ratio | IV dL/g | N. Izod ft-lb/in |
|---|---|---|---|---|
| $C_8$* | DMBA | 90/0/10 | 0.55 | 2.9 |
| 98 | DMBA | 80/10/10 | 0.56 | 16.2 |
| $C_9$* | TMBE | 90/0/10 | 0.62 | 2.7 |
| 107 | TMBE | 80/10/10 | 0.71 | 12.0 |
| $C_{10}$* | TMDHB | 90/0/10 | 0.63 | 2.9 |
| 110 | TMDHB | 80/10/10 | 0.69 | 8.0 |
| $C_{11}$* | TTDHB | 90/0/10 | 0.51 | 2.3 |
| 111 | TTDHB | 80/10/10 | 0.67 | 5.0 |

*Not an example of the invention.

Example 10

To further describe the scope of this invention, polyestercarbonates are prepared using BA, BK, TBP, HEA, and diacid chlorides (DAC) terephthaloyl chloride (TPC), isophthaloyl chloride (IPC), and adipoyl chloride (AC) according to the general procedure of Example 1 of U.S. Pat. No. 4,330,662. These results are recorded in Table XV.

TABLE XV

| Sample No. | BA/BK Molar Ratio | DAC | CS | Diester/Carbonate Molar Ratio | IV dL/g |
|---|---|---|---|---|---|
| 115 | 90/10 | TPC | TBP | 0.056 | 0.62 |
| 116 | 90/10 | TPC | TBP | 0.088 | 0.58 |
| 117 | 80/20 | TPC | TBP | 0.088 | 0.57 |
| 118 | 90/10 | TPC | TBP | 0.125 | 0.57 |
| 119 | 90/10 | TPC | TBP | 0.167 | 0.56 |
| 120 | 80/20 | TPC | TBP | 0.500 | 0.60 |
| 121 | 90/10 | TPC/IPC$^a$ | TBP | 1.500 | 0.56 |
| 122 | 90/10 | AC | HEA | 0.111 | 0.49 |
| 123 | 80/20 | AC | HEA | 0.111 | 0.52 |
| 124 | 80/20 | AC | HEA | 0.250 | 0.51 |

$^a$TPC/IPC molar ratio of 80/20.

Example 11

To further describe the scope of this invention, the polycarbonate of BK is prepared according to the general procedure of Example 1. Solubility tests (0.1 g/10 ml solvent) show that the polycarbonate is soluble in concentrated sulfuric acid and insoluble in m-cresol; sym-tetrachloroethane; 1-methyl-2-pyrollidinone; N,N-dimethylacetamide; N,N-dimethylformamide; dimethylsulfoxide; and hexamethylphosphoric triamide. This polycarbonate has an IV of 0.20 dL/g (measured in concentrated sulfuric acid at 25° C. and 0.5 g/dL) and is shown by differential scanning calorimetry to have Tg at about 111° C., a crystallization exotherm at about 152° C., and a melting transition from about 285° to 360° C., with the maximum in the melting transition at about 322° C.

What is claimed is:

1. A polymer composition in crosslinked form after exposure thereof to electromagnetic radiation having a maximum elongation at break of less than 200 percent comprising repeating units corresponding to the formula:

$$-R-O-X-O-$$

wherein R independently each occurrence is the divalent nucleus of an aromatic diol having from 2 to about 40 carbon atoms, and X corresponds to the formula:

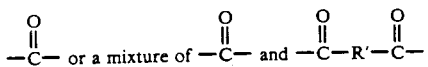

wherein R' is the divalent nucleus of an aliphatic or aromatic difunctional carboxylic acid, provided further that in more than 5 and up to 50 mole percent of the repeating units, R is the divalent nucleus of a dihydroxyaryl ketone.

2. A composition according to claim 1, wherein from more than 5 to about 30 mole percent of the repeating units, R is derived from a dihydroxyaryl ketone.

3. A composition according to claim 2, wherein from about 10 to about 20 mole percent of the repeating units, R is derived from a dihydroxyaryl ketone.

4. A composition according to claim 1 wherein the aromatic diol comprises a mixture of a dihydroxyl aryl ketone and a benzylic hydrogen containing aromatic diol.

5. A polymeric composition according to claim 4, wherein from about 5 to about 30 mole percent of the repeating units R is derived from a dihydroxyaryl ketone and in from more than 5 to about 50 mole percent of the repeating units R is derived from a benzylic hydrogen containing diol.

6. A polymeric composition according to claim 5, wherein the benzylic hydrogen containing diol is dimethyl bisphenol-A, tetramethyl bisphenol-A, bisphenol-F, or a mixture thereof.

* * * * *